# 3,686,169
THIOCYCLOAMIDES

Aubert Yaucher Coran and Joseph Edward Kerwood, Akron, Ohio, assignors to Monsanto Company, St. Louis, Mo.
No Drawing. Continuation-in-part of applications Ser. No. 549,730, May 12, 1966, Ser. No. 579,493, Sept. 15, 1966, and Ser. No. 714,445, Mar. 20, 1968, now Patent No. 3,546,185, dated Dec. 8, 1970. This application July 20, 1970, Ser. No. 56,731
Int. Cl. C07d 41/06
U.S. Cl. 260—239.3 R    10 Claims

ABSTRACT OF THE DISCLOSURE

Compounds of the formula

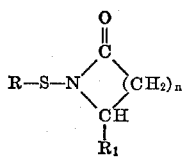

where R is alkyl, aryl or cycloalkyl, $R_1$ is hydrogen or lower alkyl and $n$ is 2 to 9 which are premature vulcanization inhibitors.

CROSS REFERENCES TO RELATED APPLICATIONS

This application is a continuation-in-part of the application Ser. No. 714,445, filed Mar. 20, 1968, now U.S. Pat. 3,546,185, Dec. 8, 1970, a continuation-in-part of the application Ser. No. 579,493, filed Sept. 15, 1966, now abandoned, and a continuation-in-part of the application Ser. No. 549,730, filed May 12, 1966, now abandoned.

Field of the invention

This invention relates to compounds useful as inhibitors of premature vulcanization in rubber which are characterized by the formula

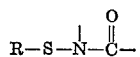

wherein the dangling valences are satisfied by alkylene.

SUMMARY OF THE INVENTION

We have discovered a class of sulfenamides which are extremely valuable inhibitors of premature vulcanization. These are characterized by the presence of a carbonyl group adjacent to the sulfenamide nitrogen. The characteristic nucleus is

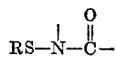

where the dangling valence on the nitrogen may be linked to a second carbonyl, alkyl, aryl, cycloalkyl, hydrogen, alkylene carbon, or arylene carbon and R is alkyl, aryl, or cycloalkyl. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the usual generic sense to mean univalent aliphatic radicals of the series $C_nH_{2n+1}$ and includes radicals substituted in the carbon chain, as for example, by aryl, alkoxy, nitro, chloro, bromo, fluoro, iodo and hydroxy. Primary, secondary and tertiary alkyls are included, for example, straight or branched chains. However, unsubstituted primary and secondary alkyl hydrocarbons of 1 to 20 carbon atoms are the preferred alkyl compounds of this invention. The term cycloalkyl includes cycloalkyl radicals of 5 to 12 carbon atoms in the ring.

The compounds of this invention are lactam derivatives wherein the valences of the nitrogen atom and the carbonyl group are attached to alkylene carbon. The compounds have the general formula

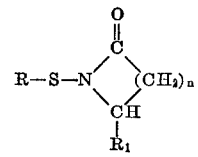

where R is alkyl, aryl or cycloalkyl; $R_1$ is hydrogen or lower alkyl and $n$ is 2 to 9. Examples of R are methyl, ethyl, propyl, isopropyl, butyl, isobutyl, sec-butyl, tert-butyl, amyl, sec-amyl, hexyl, octyl, decyl, dodecyl, eicosyl, benzyl, phenethyl, cumenyl, xylyl, phenyl, naphthyl, tolyl, ethyl phenyl, methyltolyl, ethyltolyl, cyclopentyl, cyclohexyl, cyclooctyl, cyclodecyl, cyclododecyl and similar radicals containing the before-mentioned substituents. Examples of $R_1$ are methyl, ethyl and propyl. Examples of the alkylene radical are ethylene, trimethylene, 1-(methyl) trimethylene, tetramethylene, pentamethylene, hexamethylene, heptamethylene, octamethylene and decamethylene.

Illustrative examples of compounds of this invention are

N-methylthio-2(2H)-hexahydroazepinone,
N-isopropylthio-2(2H)-hexahydroazepinone,
N-butylthio-2(2H)-hexahydroazepinone,
N-octylthio-2(2H)-hexahydroazepinone,
N-decylthio-2(2H)-hexahydroazepinone,
N-dodecylthio-2(2H)-hexahydroazepinone,
N-eicosylthio-2(2H)-hexahydroazepinone,
N-phenylthio-2(2H)-hexahydroazepinone,
N-tolylthio-2(2H)-hexahydroazepinone,
N-cyclopentylthio-2(2H)-hexahydroazepinone,
N-benzylthio-2(2H)-hexahydroazepinone,
N-cyclooctylthio-2(2H)-hexahydroazepinone,
N-cyclodecylthio-2(2H)-hexahydroazepinone,
N-cyclododecylthio-2(2H)-hexahydroazepinone,
N-ethylthio-2-piperidinone,
N-sec-butylthio-2-piperidinone,
N-hexylthio-2-piperidinone,
N-(1-methyl)-heptylthio-2-piperidinone,
N-decylthio-2-piperidinone,
N-phenylthio-2-piperidinone,
N-benzylthio-2-piperidinone,
N-tolylthio-2-piperidinone,
N-cyclohexylthio-2-piperidinone,
N-cyclooctylthio-2-piperidinone,
N-propylthio-2-pyrrolidinone,
N-tert-butylthio-2-pyrrolidinone,
N-amylthio-2-pyrrolidinone,
N-heptylthio-2-pyrrolidinone,
N-octylthio-2-pyrrolidinone,
N-decylthio-2-pyrrolidinone,
N-dodecylthio-2-pyrrolidinone,
N-phenylthio-2-pyrrolidinone,
N-naphthylthio-2-pyrrolidinone,
N-tolylthio-2-pyrrolidinone,
N-phenethylthio-2-pyrrolidinone,
N-benzylthio-2-pyrrolidinone,
N-cyclopentylthio-2-pyrrolidinone,
N-cyclohexylthio-2-pyrrolidinone,
N-cyclooctylthio-2-pyrrolidinone,
N-cyclododecylthio-2-pyrrolidinone,
N-(hexylthio)-5-methyl-2-pyrrolidinone,
N-(cyclohexylthio)-5-methyl-2-pyrrolidinone, N-(phenylthio)-5-methyl-2-pyrrolidinone,
N-butylthio-2(1H)-hexahydroazocinone,
N-cyclopentylthio-2(1H)-hexahydroazocinone,
N-phenylthio-2(1H)-hexahydroazocinone,
N-propylthio-2(2H)-octahydroazoninone,
N-octylthio-2(2H)-octahydroazoninone,
N-cyclooctylthio-2(2H)-octahydroazoninone,
N-benzylthio-2(2H)-octahydroazoninone,
N-tolylthio-2(2H)-octahydroazoninone,
N-methylthio-2-azacycloundecanone,
N-cyclodecylthio-2-azacycloundecanone,
N-phenylthio-2-azacycloundecanone,
N-cyclohexylthio-2-azacyclododecanone,
N-phenylthio-2-azacyclododecanone and analogues containing the before-mentioned substituents.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, peroxide-vulcanizing agents, organic accelerators for vulcanization and antidegradants, none being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexylsulfenamide, 2-mercaptobenzothiazole, N-tert-butyl-2-benzothiazole sulfenamide, 2-benzothiazolyl diethyldithiocarbamate and 2-(morpholinothio)benzothiazole can be used. Amine salts of mercaptobenzothiazole accelerators, for example, the t-butyl amine salt of mercaptobenzothiazole, like salts of morpholine, and 2,6-dimethyl morpholine, can be used in the invention. Thiazole accelerators other than aromatic can be used. Stocks containing accelerators, for example, the tetramethylthiuram disulfide, tetramethylthiuram monosulfide, aldehyde amine condensation products, thiocarbamylsulfenamides, thioureas, xanthates and guanidine derivatives, are substantially improved using the process of our invention. Examples of thiocarbamylsulfenamide accelerators are shown in U.S. Pats. 2,381,392, Smith assigned to Firestone, 2,-388,236, Cooper assigned to Monsanto, 2,424,921, Smith assigned to Firestone, and British Pat. 880,912, Dadson assigned to Imperial Chemical Industries Limited. The invention is applicable to accelerator mixtures. The invention is applicable to stocks containing amine antidegradants. Rubber mixes containing antidegradants, for example, N-1,3-dimethylbutyl - N' - phenyl-p-phenylenediamine, N,N'-bis(1,4-dimethylpentyl) - p - phenyldiamine, and other phenylenediamines, ketone, ether and hydroxy antidegradants and mixtures thereof, are substantially improved using the process of our invention. Mixtures of antidegradants, for example, a mixture of N-1,3-dimethylbutyl-N'-phenyl-p-phenylenediamine and N,N'-bis(1,4-dimethylpentyl) - p - phenylenediamine, furnish a much improved final product when used with the inhibitors of this invention.

The inhibitors of our invention can be used in natural and synthetic rubbers and mixtures thereof. Synthetic rubbers that can be improved by the process of this invention include cis-4-polybutadiene, butyl rubber, ethylene-propylene diene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate.

The invention relates to diene rubbers and the terms rubber and diene rubber are synonymous for the purpose of this invention.

DESCRIPTION OF THE PREFERRED EMBODIMENTS

The compounds of this invention are conveniently prepared at room temperature by contacting an amide with the appropriate sulfenyl chloride in the presence of an acid acceptor. Amides suitable in the practice of this invention are 2-pyrrolidinone (2-pyrrolidone), 5-methyl-2-pyrrolidinone, 2-piperidinone (2-piperidone), hexahydro-2H-azepin-2-one, 2-azacyclooctanone, 2-azacyclononone, 2-azacyclononone, 2-azacyclodecanone, 2-azacycloundecanone and 2-azacyclododecanone.

Illustrative examples for the preparation of the compounds of this invention are given in greater detail below.

EXAMPLE 1

To a solution containing 22.6 g. (0.2 mole) 2-oxohexamethylenimine (caprolactam) and 22 grams triethylamine in 100 ml. of dichloromethane is added 0.2 mole of cyclohexyl sulfenyl chloride at room temperature. After stirring the mixture for two hours, the reaction is quenched in about a liter of cold water. The organic layer is separated and the solvent removed by evaporation. A white solid identified by nuclear magnetic resonnance spectral analysis (designated NMR hereinafter) as N-(cyclohexylthio)-2-(2H)hexahydroazepinone, M.P. 48–50° C., is obtained. Analysis gives 63.51% C, 9.15% H, 6.03% N and 14.16% S compared to 63.35% C, 9.32% H, 6.16% N and 14.09% S calculated for $C_{12}H_{21}NOS$.

EXAMPLE 2

N-(phenylthio)-2(2H)-hexahydroazepinone is prepared by the procedure of Example 1 except benzene sulfenyl chloride is used. 27 grams of N-(phenylthio)-2(2H)-hexahydroazepinone which melts at 69° C. is obtained. Identification is confirmed by NMR analysis. Chemical analysis gives 64.98% C, 6.87% H, 6.21% N and 14.41% S compared to 65.12% C, 6.83% H, 6.32% N and 14.49% S calculated for $C_{12}H_{15}NOS$.

EXAMPLE 3

N - (p-nitrophenylthio)-2(2H)-hexahydroazepinone is prepared by adding p-nitrophenyl sulfenyl chloride to 22 grams of caprolactam and 22 grams of triethylamine in 200 ml. of dimethylformamide. A rise in temperature is observed, after allowing the mixture to cool, the reaction mixture is quenched in water to give a yellow solid, M.P. 97–100° C. The crude material is recrystallized in ethanol to give substantially pure N-(p-nitrophenylthio)-2(2H)-hexahydroazepinone, M.P. 107–111° C. NMR analysis indicates that a small amount of p-nitrophenyl disulfide remains in the product.

EXAMPLE 4 n-Octyl sulfenyl chloride (0.2 mole) is added at room temperature to a solution of 2-pyrrolidinone (17 g., 0.2 mole) and triethylamine (22 g.) in dichloromethane. Reaction is indicated by a temperature rise of the reaction mixture. The mixture is allowed to cool for two hours and then quenched in water. The organic layer is separated and dried. The solvent is vacuum stripped to give a brown oil. The oil is dissolved in hexane and cooled to −78° C. to give yellow crystals which are recovered by filtration. The crystals are allowed to melt under vacuum to give 21 grams of a yellow oil identified by NMR analysis as N-(n-octylthio) - 2 - pyrrolidinone. Chemical analysis gives 62.61% C, 10.05% H, 6.18% N and 14.06% S compared to 62.83% C, 10.11% H, 6.11% N and 13.98% S calculated for $C_{12}H_{23}NOS$.

EXAMPLE 5

N-(phenylthio)-2-pyrrolidinone is prepared by using benzene sulfenyl chloride following the procedure of Example 4. The product is a dark viscous oil. Identification is confirmed by NMR analysis.

The following tables illustrate the invention in greater detail. For all the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto Oscillating Disc Rheometer described by Decker, Wise and Guerry in Rubber World, December 1962, page 68. From the Rheometer data, R.M.T. is the maximum torque in Rheometer units, $t_2$ is the time in minutes for a rise of two Rheometer units above the minimum reading and $t_{90}$ is the time required to obtain a torque 90% of the maximum.

A natural rubber masterbatch is prepared comprising:

| | Parts by weight |
|---|---|
| Smoked sheets | 100 |
| Intermediate super abrasion furnace carbon black | 45 |
| Zinc oxide | 3 |
| Stearic acid | 2 |
| Aromatic oil | 5 |

Vulcanizable stocks are prepared by mixing accelerator, sulfur and inhibitor with the masterbatch. Vulcanizates are prepared by press curing the stocks at 144° C. until optimum cure.

TABLE I

| Ingredients | Stock A | Stock B |
|---|---|---|
| Masterbatch | 155 | 155 |
| Sulfur | 2.2 | 2.2 |
| N-tert-butyl-2-benzothiazole sulfenamide | 0.5 | 0.5 |
| N-(cyclohexylthio)-2(2H)-hexahydroazepinone | | 0.25 |
| Mooney scorch at 121° C.: | | |
| $t_5$ | 31.5 | 55.8 |
| Percent increase in scorch delay | | 75 |
| Rheometer at 144° C.: | | |
| $t_2$ | 9.6 | 14.7 |
| $t_{90}-t_2$ | 14.4 | 13.0 |
| 300% modulus | 1,360 | 1,460 |

The inhibitors are effective in the presence of amine anti-degradants as is demonstrated in Table II.

TABLE II

| Ingredients | Stock C | Stock D | Stock E |
|---|---|---|---|
| Masterbatch | 155 | 155 | 155 |
| Sulfur | 2 | 2 | 2 |
| N-tert-butyl-2-benzothiazole sulfenamide | 0.5 | 0.5 | 0.5 |
| N-(cyclohexylthio)-2(2H)-hexahydroazepinone | | 0.5 | 1.0 |
| N-(1,3-dimethylbutyl)-N'-(phenyl)-p-phenylenediamine | 2.0 | 2.0 | 2.0 |
| Mooney scorch at 121° C.: | | | |
| $t_5$ | 33 | 71 | 90 |
| Percent in scorch delay | | 115 | 173 |
| Rheometer at 144° C.: | | | |
| $t_2$ | 8 | 16 | 19.5 |
| $t_{90}-t_2$ | 14 | 12.5 | 11.0 |
| R.M.T | 50 | 56 | 59 |

The Rheometer maximum torque and the modulus data indicate that the inhibitor also activates the cure which results in additional cross-linking.

The compounds of this invention effectively inhibit premature vulcanization of rubber stocks containing peroxide vulcanizing agents as is shown in Table III.

TABLE III

| Ingredients | Stock F | Stock G |
|---|---|---|
| Masterbatch | 155 | 155 |
| N-(1,3-dimethylbutyl)-N'-phenyl-p-phenylenediamine | 2 | 2 |
| Dicumyl peroxide | 5 | 5 |
| N-(cyclohexylthio)-2(2H)-hexahydroazepinone | | 0.5 |
| Mooney scorch at 121° C.: | | |
| $t_5$ | 44.8 | 87.6 |
| Percent increase in scorch delay | | 95 |
| Rheometer at 153° C.: | | |
| $t_2$ | 4 | 4 |
| $t_{90}-t_2$ | 23 | 29 |
| R.M.T | 43.0 | 41.2 |

The premature vulcanization inhibitor activity of compounds of this invention is further demonstrated in Table IV.

TABLE IV

| Ingredients | Stock H | Stock I | Stock J | Stock K |
|---|---|---|---|---|
| Masterbatch | 155.0 | 155.0 | 155.0 | 155.0 |
| Sulfur | 2.0 | 2.0 | 2.0 | 2.0 |
| N-(1,3-dimethylbutyl)-N'-phenyl-p-phenylenediamine | 2.0 | 2.0 | 2.0 | 2.0 |
| N-tert-butyl-2-benzothiazole sulfenamide | 0.5 | 0.5 | 0.5 | 0.5 |
| N-(n-octylthio)-2-pyrrolidinone | | 0.5 | | |
| N-phenylthio-2(2H)-hexahydroazepinone | | | 0.5 | |
| N-(p-nitrophenylthio)-2(2H)-hexahydroazepinone | | | | 0.5 |
| Mooney scorch at 121° C.: | | | | |
| $t_5$ | 28.5 | 60.8 | 61.3 | 36.0 |
| Percent increase in scorch delay | | 113 | 119 | 26 |
| Rheometer at 144° C.: | | | | |
| $t_2$ | 8.3 | 12.8 | 13.6 | 9.0 |
| $t_{90}-t_2$ | 12.7 | 11.3 | 12.2 | 11.5 |
| R.M.T | 64 | 64 | 65 | 67 |

N-(phenylthio)-2-pyrrolidinone tested at 0.5 part in a stock similar to those in Table IV gives 99% increase in scorch delay.

The data of Table V demonstrates the increased processing safety obtained with the inhibitors of this invention in oil-extended styrene-butadiene copolymer rubber.

TABLE V

| Ingredients | Stock L | Stock M | Stock N |
|---|---|---|---|
| Oil-extended styrene-butadiene copolymer | 137.5 | 137.5 | 137.5 |
| Intermediate super abrasion furnace carbon black | 65.0 | 65.0 | 65.0 |
| Zinc oxide | 3.0 | 3.0 | 3.0 |
| Stearic acid | 1.0 | 1.0 | 1.0 |
| Hydrocarbon softener | 1.5 | 1.5 | 1.5 |
| N-(1,3-dimethylbutyl)-N'-phenyl-p-phenylenediamine | 2.0 | 2.0 | 2.0 |
| Sulfur | 1.8 | 1.8 | 1.8 |
| 2.(morpholinothio) benzothiazole | 1.2 | 1.2 | 1.2 |
| N-(cyclohexylthio)-2(2H)-hexahydroazepinone | | 0.5 | 1.0 |
| Mooney scorch at 135° C.: | | | |
| $t_5$ | 28.3 | 45.5 | 57.1 |
| Percent increase in scorch delay | | 61 | 102 |
| Rheometer at 153° C.: | | | |
| $t_2$ | 9.0 | 12.0 | 14.0 |
| $t_{90}-t_2$ | 14.8 | 13.5 | 12.5 |
| R.M.T | 56 | 55 | 54.0 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

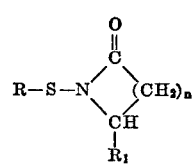

wherein R is unsubstituted primary or secondary alkyl hydrocarbon of 1–20 carbon atoms, cycloalkyl of 5–12 carbon atoms, benzyl, phenethyl, unsubstituted aryl or substituted aryl wherein aryl is phenyl or naphthyl and the substituents are selected from the group consisting of lower alkyl, lower alkoxy, nitro, chloro, bromo, fluoro, iodo and hydroxy not more than one electronegative substituent being present; $R_1$ is hydrogen or lower alkyl and $n$ is 2 to 9.

2. A compound according to claim 1 wherein $n$ is 2 to 4 and $R_1$ is hydrogen.

3. A compound according to claim 2 wherein R is cycloalkyl.

4. A compound according to claim 2 wherein R is octyl and $n$ is 2.

5. A compound according to claim 2 wherein R is phenyl and $n$ is 2.

6. A compound according to claim 2 wherein $n$ is 4.

7. A compound according to claim 6 wherein R is cyclohexyl.

8. A compound according to claim 6 wherein R is phenyl.

9. A compound according to claim 6 wherein R is p-nitrophenyl.

10. A compound according to claim 1 wherein R is hydrocarbon.

References Cited

UNITED STATES PATENTS

| 3,066,020 | 11/1962 | Tilles et al. | 260—293.85 |
| 3,117,975 | 1/1964 | Bortnick et al. | 260—293.85 |
| 3,278,526 | 10/1966 | Louthan et al. | 260—326.5 S |

FOREIGN PATENTS

| 159,849 | 4/1964 | U.S.S.R. | 260—239.3 R |
| 161,766 | 4/1964 | U.S.S.R. | 260—239.3 R |
| 168,704 | 3/1965 | U.S.S.R. | 260—239.3 R |

HENRY R. JILES, Primary Examiner

R. T. BOND, Assistant Examiner

U.S. Cl. X.R.

260—293.85, 326.5 S, 780; 252—426